US009231671B1

(12) United States Patent
Zhan et al.

(10) Patent No.: US 9,231,671 B1
(45) Date of Patent: Jan. 5, 2016

(54) METHOD AND APPARATUS FOR LINK OPTIMIZATION IN A WI-FI HOME NETWORK

(71) Applicant: Quantenna Communications, Inc., Fremont, CA (US)

(72) Inventors: Pengcheng Zhan, San Jose, CA (US); Neville Young, Glenwood, NSW (AU); Qasem Aldrubi, Fremont, CA (US); Hossein Dehghan, Diablo, CA (US)

(73) Assignee: Quantenna Communications Inc., Fremont, CA (US)

( * ) Notice: Subject to any disclaimer, the term of this patent is extended or adjusted under 35 U.S.C. 154(b) by 212 days.

(21) Appl. No.: 13/892,291

(22) Filed: May 12, 2013

Related U.S. Application Data (60) Provisional application No. 61/801,148, filed on Mar. 15, 2013.

(51) Int. Cl.
  *H04W 4/00* (2009.01)
  *H04B 7/04* (2006.01)
(52) U.S. Cl.
  CPC ................... *H04B 7/0413* (2013.01)
(58) Field of Classification Search
  USPC ........................... 370/329–338; 375/267–343
  See application file for complete search history.

(56) References Cited

U.S. PATENT DOCUMENTS

| | | | | |
|---|---|---|---|---|
| 6,642,887 B2 * | 11/2003 | Owechko | ...................... | 342/373 |
| 7,248,841 B2 * | 7/2007 | Agee et al. | ..................... | 455/101 |
| 7,761,059 B2 * | 7/2010 | Lau | .................................. | 455/69 |
| 7,961,807 B2 * | 6/2011 | Kotecha et al. | ............... | 375/267 |
| 8,135,092 B2 * | 3/2012 | Kim | .................................. | 375/320 |
| 8,437,422 B2 * | 5/2013 | Mundarath et al. | ........... | 375/267 |
| 8,446,971 B2 * | 5/2013 | Li et al. | ......................... | 375/260 |
| 8,509,339 B2 * | 8/2013 | Kotecha et al. | ............... | 375/267 |
| 8,571,127 B2 * | 10/2013 | Jiang et al. | ..................... | 375/267 |
| 8,599,780 B2 * | 12/2013 | Heidari et al. | ............... | 370/329 |
| 8,644,413 B2 * | 2/2014 | Harel et al. | .................... | 375/267 |

* cited by examiner

*Primary Examiner* — Man Phan
(74) *Attorney, Agent, or Firm* — IP Creators; Charles C. Cary (57) ABSTRACT

A link optimizer for optimizing a link on a wireless local area network (WLAN). The link optimizer including: a beamform matrix generator configured to generate discrete candidate beamforming matrices for spatially modulating successive communication packets from a multiple-input multiple-output (MIMO) capable transmitter one of the WLAN nodes that supports beamforming to a recipient one of the nodes that does not support beamforming; and a beamform evaluator configured to evaluate discrete ones among the set of candidate beam forming matrices generated by the beamform matrix generator based on receipt acknowledgements from the recipient one of the nodes for each successive communication packet transmitted from the MIMO capable transmitter one of the nodes; and to utilize a successfully evaluated one of the candidate beam forming matrices for transmission of subsequent communication packets from the MIMO transmitter one of the nodes to the recipient one of the nodes.

5 Claims, 6 Drawing Sheets

Method for WLAN Link Optimization

Method for WLAN Link Optimization   FIG. 7

METHOD AND APPARATUS FOR LINK OPTIMIZATION IN A WI-FI HOME NETWORK

CROSS REFERENCE TO RELATED APPLICATION

This application claims the benefit of prior filed co-pending Provisional Applications No. 61/801,148 filed on Mar. 15, 2013 entitled "Open Loop Link Performance Optimization in 802.11" which are incorporated herein by reference in their entirety as if fully set forth herein.

BACKGROUND OF THE INVENTION

1. Field of Invention

The field of the present invention relates in general to wireless local area networks (WLAN) including wireless access points (WAP) and wireless stations and methods for optimizing links on same.

2. Description of the Related Art

Home and office networks, a.k.a. wireless local area networks (WLAN) are increasingly set up and serviced using a device called a Wireless Access Point (WAP). The WAP may include a router. The WAP couples all the devices of the home network, e.g. wireless stations such as: computers, printers, televisions, digital video (DVD) players and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a single channel. Each home has a WAP which forms the center piece of the associated wireless networking between all the wireless enabled devices in the home, a.k.a. wireless stations or wireless network nodes. The WAP self-selects one of a number of frequency division multiplexed channels on which its network nodes or devices will communicate.

After selection of a single channel for the associated home network, the WAP controls access to the shared communication medium using a multiple access methodology identified as Carrier Sense Multiple Access (CSMA). CSMA is a distributed random access methodology first introduced for home wired networks such as Ethernet for sharing a single communication medium, by having a contending communication link back off and retry access to the line if a collision is detected, i.e. if the line is in use.

Communications on the single communication medium are identified as "Simplex" meaning, one communication stream from a single source node to one or more target nodes at one time, with all remaining nodes capable of "listening" to the subject transmission. To confirm arrival of each communication packet, the target node is required to send back an acknowledgment, a.k.a. "ACK" packet to the source. Absent the receipt of the ACK packet the source will retransmit the unacknowledged data until an acknowledgement is received, or a time-out is reached.

To improve the throughput on each point-to-point link between a WAP and a station, multiple antennas may be used. Devices with multiple antennas can exploit any of a number of techniques to increase link throughput specifically: a) controlling how data is loaded on to each antenna, b) how data is coded, and c) how the antennas signals are aimed at the receiving station. Typically, during an association phase the transmitting and receiving device identify their capabilities and agree on a compatible, i.e. common denominator, set of loading, coding and aiming options after which communications are initiated on the link.

What is needed is an improved method of operating a WLAN.

SUMMARY OF THE INVENTION

The present invention provides a method and apparatus for optimizing a link on a wireless local area network (WLAN), supporting wireless communications between a wireless access point (WAP) node and associated station nodes on a selected one of a plurality of communication channels. In an embodiment of the invention the link optimizer apparatus comprises a beamform matrix generator and a beamform evaluator. The beamform matrix generator is configured to generate discrete candidate beamforming matrices for spatially modulating successive communication packets from a multiple-input multiple-output (MIMO) capable transmitter one of the nodes that supports beamforming to a recipient one of the nodes that does not support beamforming. The beamform evaluator is configured to evaluate discrete ones among the set of candidate beam forming matrices generated by the beamform matrix generator based on receipt acknowledgements from the recipient one of the nodes for each successive communication packet transmitted from the MIMO capable transmitter one of the nodes; and to utilize a successfully evaluated one of the candidate beam forming matrices for transmission of subsequent communication packets from the MIMO transmitter one of the nodes to the recipient one of the nodes, thereby avoiding a requirement for either link calibration or feedback of a channel matrix or a beamforming matrix from the recipient node.

The invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

The present invention provides a method and apparatus for optimizing link throughput in wireless local area networks (WLAN) having legacy devices with a single antenna, or with multiple antennas but without support for beamforming. No feedback or calibration is required to select a beamform matrix suitable for enhancing communications to either of these types of legacy devices.

Figure 1:
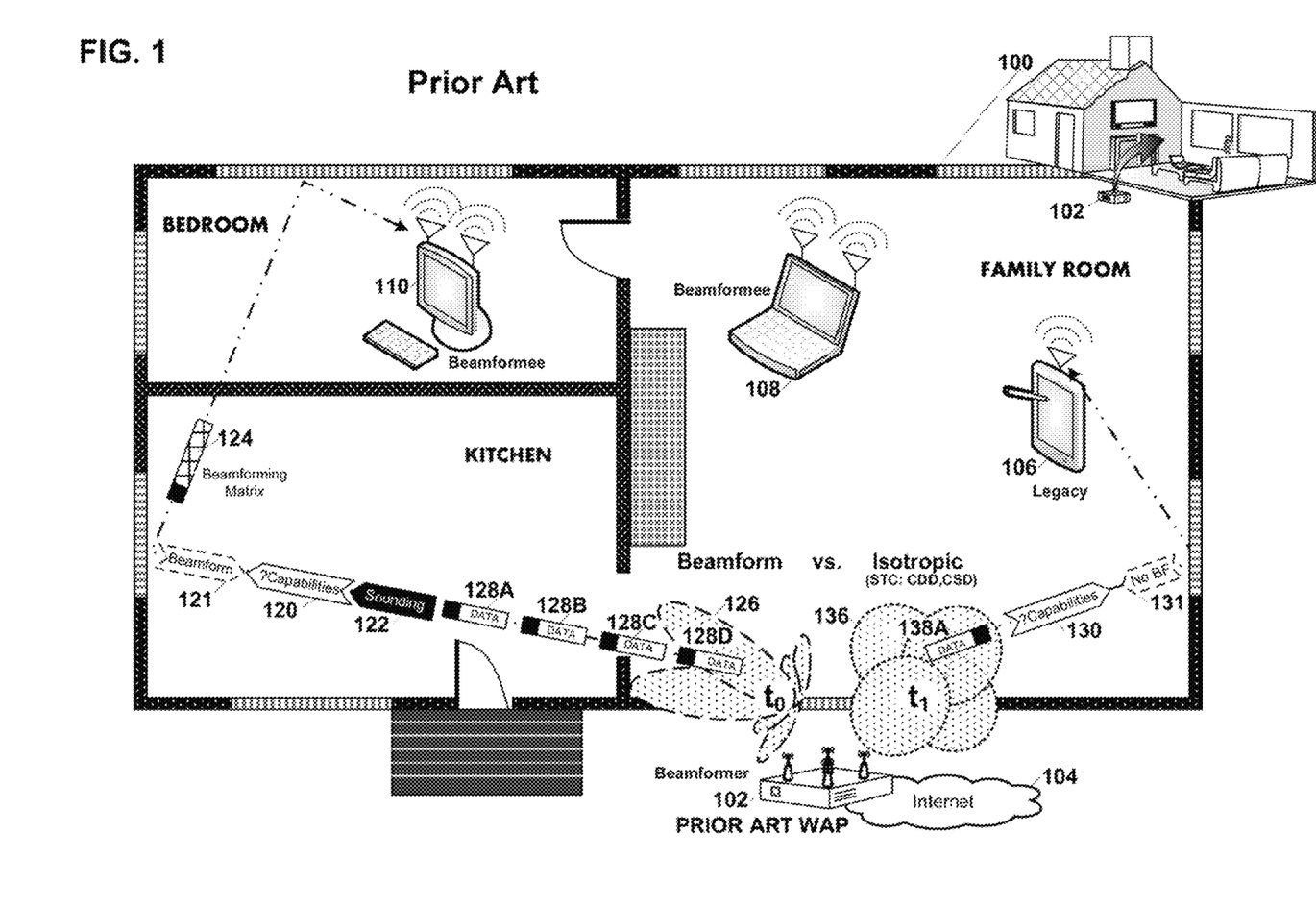
FIG. 1 is a network diagram showing a wireless local area network (WLAN) in a home using a prior art approach to communicate with a legacy device that does not support beamforming.

FIG. 1 is a network diagram showing a wireless local area network (WLAN) in a home using a prior art approach to communicate with a legacy device that does not support beamforming and therefore can not provide its attendant advantages in terms of increased throughput. WLAN communications are simplex, between one pair of nodes in one direction at one point in time. A home 100 is shown with station nodes 106, 108, 110 provided with networking and wireless Internet 104 access by prior art wireless access point (WAP) node 102. The WAP may support any of a number of standards within the IEEE 802.11 family. In the example shown WAP supports beamforming as specified by IEEE 802.11n standard for example, requiring for its practice the support by both sending and receiving device for beamforming, including identifying mutual beamforming support in the capabilities exchange, followed by further cooperative channel calibration or channel characterization, or beamforming matrix determinations carried out by the sending and receiving parties as shown in FIG. 1. Absent such capabilities on the part of both devices setting up the link, the WAP can not use beamforming.

In FIG. 1 two simplex communication inks are shown. The first initiated at time to is between transmitting WAP 102 and receiving station 110. The second initiated at time $t_1$ is between transmitting WAP 102 and receiving legacy station 106. In FIG. 1 at time $t_0$ the prior art WAP 102 initiates establishment of a link with station 110 which supports beamforming. In the capabilities exchange (120-121) the WAP and station determine whether there is mutual beamforming support. Next the WAP sends a sounding packet 122 as specified by the IEEE 802.11n and other standards, which allows the receiving station 110 to calculate the beamforming matrix required for transmissions across the link. The station 110 sends this beamforming matrix 124 or equivalent indicia such as a channel matrix to the WAP 102.

The WAP uses the received beamforming matrix to initiate data communications with the station 110 including beamformed data packets 128A, 128B, 128C, 128D. The aggregate signal radiation pattern 126 formed by the four antennas on WAP 102 with the beamforming matrix determined by the station 110 exhibits prominent lobes with a high degree of directionality, thereby improving throughput over the link between beamformer WAP 102 and beamformee station 110.

The prior art WAP is however hobbled to less optimal, non-beamform communication techniques in its communications with legacy devices which do not support beamforming. One such device, i.e. PDA 106 is shown. Such device may have one or more antenna. In the example shown the PDA has a single antenna, and does not support beamforming as identified in the capability exchange. In FIG. 1 at time $t_1$ the prior art WAP 102 initiates establishment of a link with legacy station 106 which does not support beamforming. In the capabilities exchange (130-131) the WAP and station (e.g. PDA) determine whether there is mutual beamforming support. As a result no sounding packet is sent and the legacy device 106 does not determine a beamforming matrix. The WAP then resorts to remaining communication options, including the use of a single antenna for communications with the legacy device or the use of multiple antenna with an isotropic (omnidirectional) radiation pattern 136 mimicking that of a single antenna. Other signal spreading techniques identified as Cyclic Delay Diversity (CDD), a.k.a. Cyclic Shift Diversity (CSD) may also be used. Absent beamforming support however, any of the above remaining options result in generally reduced throughput across the communication link between WAP 102 and legacy device 106. In the example shown, communications between WAP 102 and legacy device commence with transmission of data packet 138A.

Figure 2:
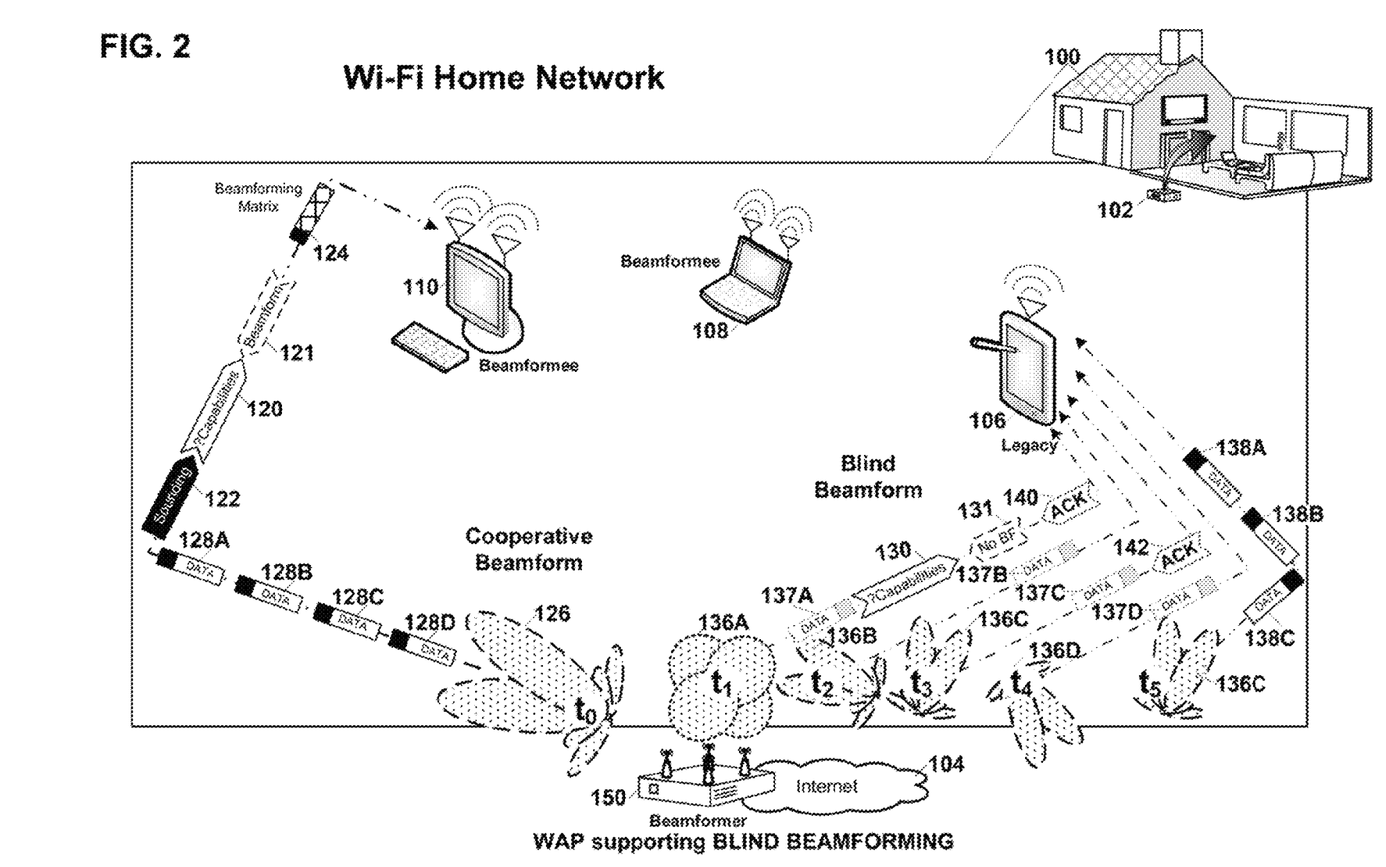
FIG. 2 is a network diagram of the WLAN shown in FIG. 1 showing an embodiment of the invention in which beamforming can be used to communicate with legacy devices that do not support beamforming.

FIG. 2 is a network diagram of the WLAN shown in FIG. 1 showing an embodiment of the invention in which beamforming can be used to increase link throughput with legacy devices that do not support beamforming. The WAP 150 has multiple antennas, e.g. four, and also includes support for blind beamforming with legacy devices without requiring beamforming support on the legacy device itself.

Cooperative beamforming is again initiated at time to as discussed in the prior FIG. 1 between the WAP 150 and station 110 which supports beamforming. After capabilities exchange 120-121 in which support for beamforming by the receiver 110 is confirmed the WAP 150 sends a sounding packet 122 and the station 110 in response determines and sends the beamforming matrix 124 or equivalent indicia such as the channel matrix, or channel matrix coefficients back to the WAP 150. The WAP uses the received beamforming matrix to initiate data communications with the station 110 including beamformed data packets 128A, 128B, 128C, 128D.

Communications between the novel WAP 150 supporting blind beamforming and the legacy device 106 which does not support beamforming are also shown in FIG. 2. Once again the legacy device, i.e. station (PDA) 106 does not support beamforming. This deficiency is identified in the capabilities exchange 130-131 in which the PDA sends no indication that it supports beamforming. Upon receipt of such indication the WAP determines beamforming matrices on its own and initiates data communications using several candidate beamforming matrices to condition the radiation pattern generated by the signals from its multiple antennas. The relative effectiveness of each beamform candidate matrix is evaluated based on "ACK" receipts, which indicate whether the corresponding data packet(s) are received or not. After this initial beamprobing, the best among the candidate beamforming matrices is selected based on a comparison of the relative numbers of receipt confirmations of the packets sent using each candidate beamforming matrix. This best candidate beamforming matrix is used for the spatial mapping of data to antennas for subsequent data communications, including potential retransmission of packets that were not received during the beamprobing phase of operations.

Such beamprobing phase of operations is shown in FIG. 2 between WAP 150 and legacy station 106. At time $t_1$ the WAP 150 sends data packet(s) 137A using an isotropic (omnidirectional) radiation pattern 136A. Receipt acknowledgments (ACK) 140 are received from legacy receiving station 106. At time intervals $t_2$, $t_3$, $t_4$ the WAP sends one or more data packets using three distinct candidate beamforming matrices for spatial mapping the data onto the antennas. At time interval $t_2$ data packet(s) 137B are sent using a first candidate beamforming matrix the radiation pattern 136B of which is shown. No receipt acknowledgement (ACK) is received from legacy receiving station 106. At time interval $t_3$ data packet(s) 137C are sent using a second candidate beamforming matrix the radiation pattern 136C of which is shown. Receipt acknowledgments (ACK) 142 are received from legacy receiving station 106. At time interval $t_4$ data packet(s) 137D are sent using a third candidate beamforming matrix the radiation pattern 136D of which is shown. No receipt acknowledgement (ACK) is received from legacy receiving station 106. The WAP compares the relative numbers of receipt acknowledgements on a percentage or absolute basis and determines the best among the candidate beamforming matrices, e.g. the matrix associated with the beamform radiation pattern 136C used commencing at time $t_3$ to send beamprobing packet(s). Subsequent data communications packets, e.g. 138A, 138B, 138C are sent commencing at time $t_0$ using the beamforming matrix associated with beamform signal radiation pattern 136C. The benefit provided by this embodiment of the invention is the higher throughputs associated with beamforming even when communicating with legacy devices that do not support beamforming.

Figure 3A:
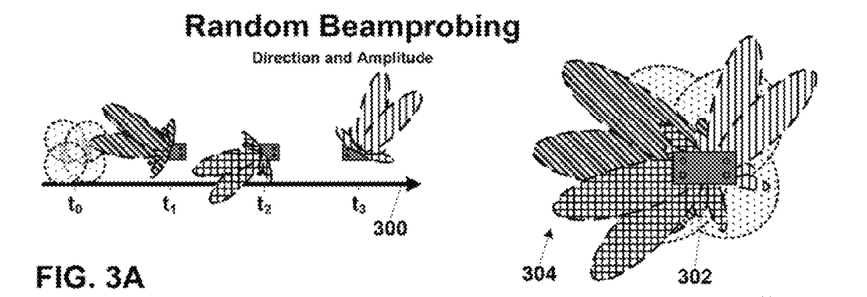
FIGS. 3A, 3B, 3C are signal radiation diagrams showing various embodiments of the invention for generating beamforming matrices.
Figure 3B:
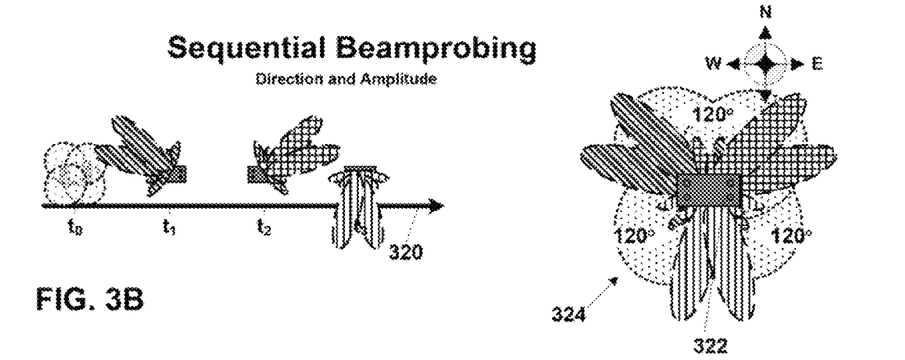
Figure 3C:
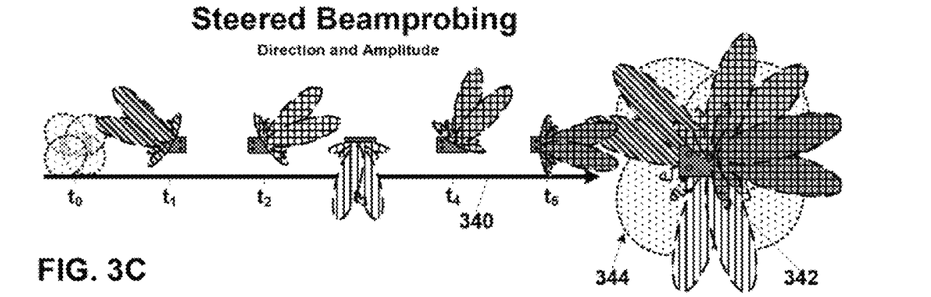

FIGS. 3A, 3B, 3C are signal radiation diagrams showing various embodiments of the invention for generating beamforming matrices.

In FIG. 3A the beamforming matrices for beamprobing are randomly generated. The signal radiation patterns associated with an isotropic signal, and three beamformed signals varying in either or both direction and amplitude are shown. Data packet(s) (not shown) using each are sent commencing at times $t_0$, $t_1$, $t_2$ and $t_3$. The aggregate pattern 304 is shown on the right with the multiple antenna WAP 302 generating such radiation profiles superimposed on same.

In FIG. 3B the beamforming matrices for beamprobing are sequentially generated, i.e. generated in an ordered sequence. The signal radiation patterns associated with the isotropic signal, and three beamformed signals varying in either or both direction and amplitude are shown. Data packet(s) (not shown) using each are sent commencing at times $t_0$, $t_1$, $t_2$ and $t_3$. The aggregate pattern 304 is shown on the right with the multiple antenna WAP generating such radiation profiles superimposed on same. The ordered selection of beamforming matrices results in an ordered distribution of the associated primary lobes of each, in this example, at 120° angles with respect to each other. The aggregate pattern 324 is shown on the right with the multiple antenna WAP 322 generating such radiation profiles superimposed on same.

In FIG. 3C the beamforming matrices for beamprobing are steered. Steering involves the evaluation of prior beamforming/probing matrices and their relative effectiveness in terms of confirmed receipts by the receiving node, as a basis for determining or selecting subsequent beamforming/probing matrices. In this example the first three beamforming matrices associated with the radiation patterns shown at times t1, t2, and t3 are used to determine or select the beamforming/probing matrices associated with the radiation patterns shown at times t4 and t5 spatially proximate the best of the three prior beamform matrices. The aggregate pattern 344 is shown on the right with the multiple antenna WAP 342 generating such radiation profiles superimposed on same.

Figure 4:
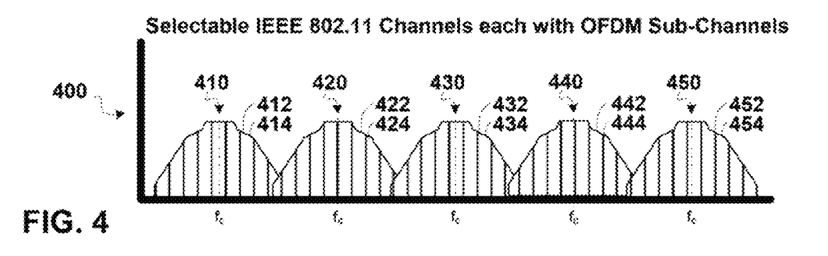
FIG. 4 is a signal diagram showing the typical selectable orthogonal frequency division multiplexed (OFDM) channels a selected one of which supports communications on the WLAN shown in FIG. 2.

FIG. 4 is a signal diagram 400 showing the typical selectable orthogonal frequency division multiplexed (OFDM) channels a selected one of which supports communications on the WLAN shown in FIG. 2. Five channels are shown adjacent one another across a designated spectrum. Channel 410 and associated sub-channels, e.g. sub-channels 412, 414 are shown. Channel 420 and associated sub-channels, e.g. sub-channels 422, 424 are shown. Channel 430 and associated sub-channels, e.g. sub-channels 432, 434 are shown. Channel 440 and associated sub-channels, e.g. sub-channels 442, 444 are shown. Channel 450 and associated sub-channels, e.g. sub-channels 452, 454 are shown.

Figure 5A:
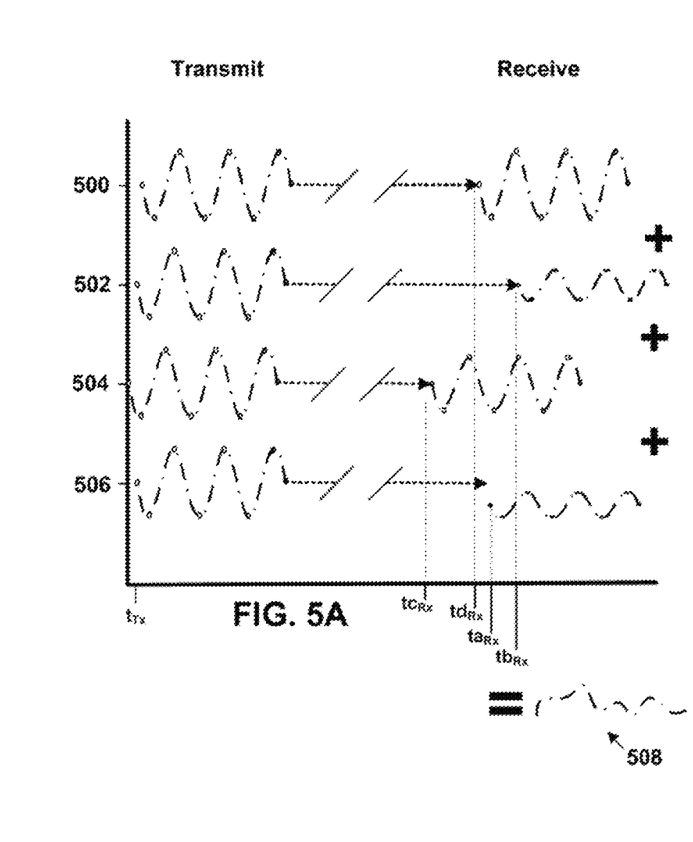
FIGS. 5A-5B are multiple-input multiple-output (MIMO) signal diagrams showing how a beamforming matrix can be used to increase throughput between a MIMO device which supports beamforming and a legacy device which does not in accordance with an embodiment of the invention.
Figure 5B:
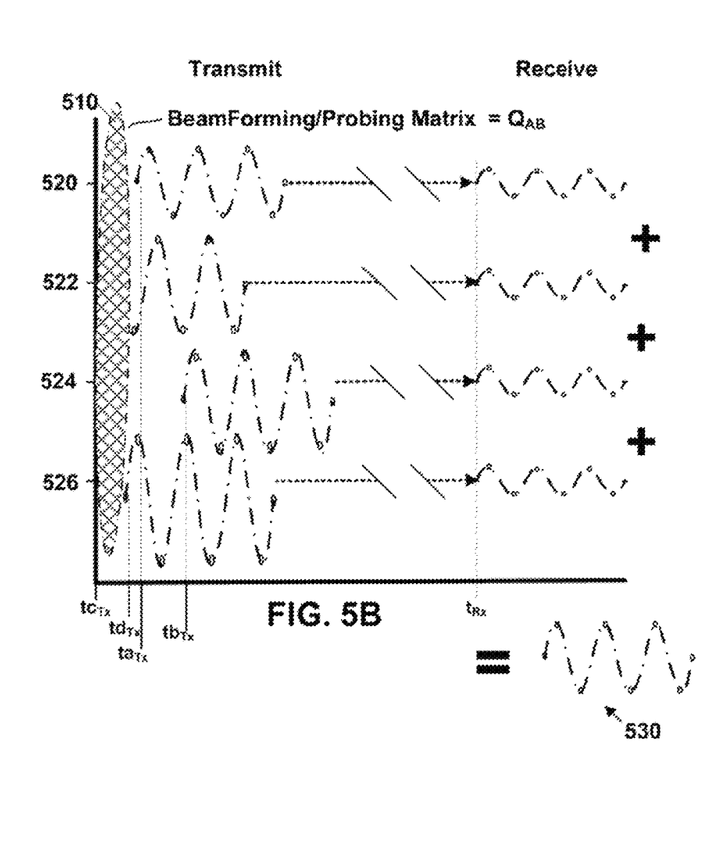

FIGS. 5A-5B are multiple-input multiple-output (MIMO) signal diagrams showing how, in accordance with an embodiment of the invention, a beamforming matrix can be used to increase throughput between a MIMO device which supports beamforming and a legacy device which does not.

FIG. 5A shows signal transmissions 500, 502, 504, 506 transmitted through each of the four separate antennas of WAP 102 without beamforming. The channel each signal experiences result in shifts in phase and amplitude of each signal, such that on arrival at a single antenna of a legacy receiver the signals exhibit destructive interference with one another to produce resultant waveform 508. This is a representative result with multiple antennas and without beamforming.

FIG. 5B shows signal transmissions 520, 522, 524, 526 transmitted through a beamforming matrix resulting from beamprobing on each of the four separate antennas of WAP 150. The beamforming matrix produces shifts in the phase and amplitude of each transmitted signal from each antenna in a phase and magnitude which offset the attenuation and phase shifts of the channel each experiences. As a result of this beamforming the signals from each antenna arrive at a single antenna of a legacy receiver where they constructively interfere with one another to produce waveform 530, which exhibits improved gain and coherency as opposed to the single antenna or isotropic approaches to communicating with legacy devices as used by prior art WAPs which do not support beamforming.

Figure 6:
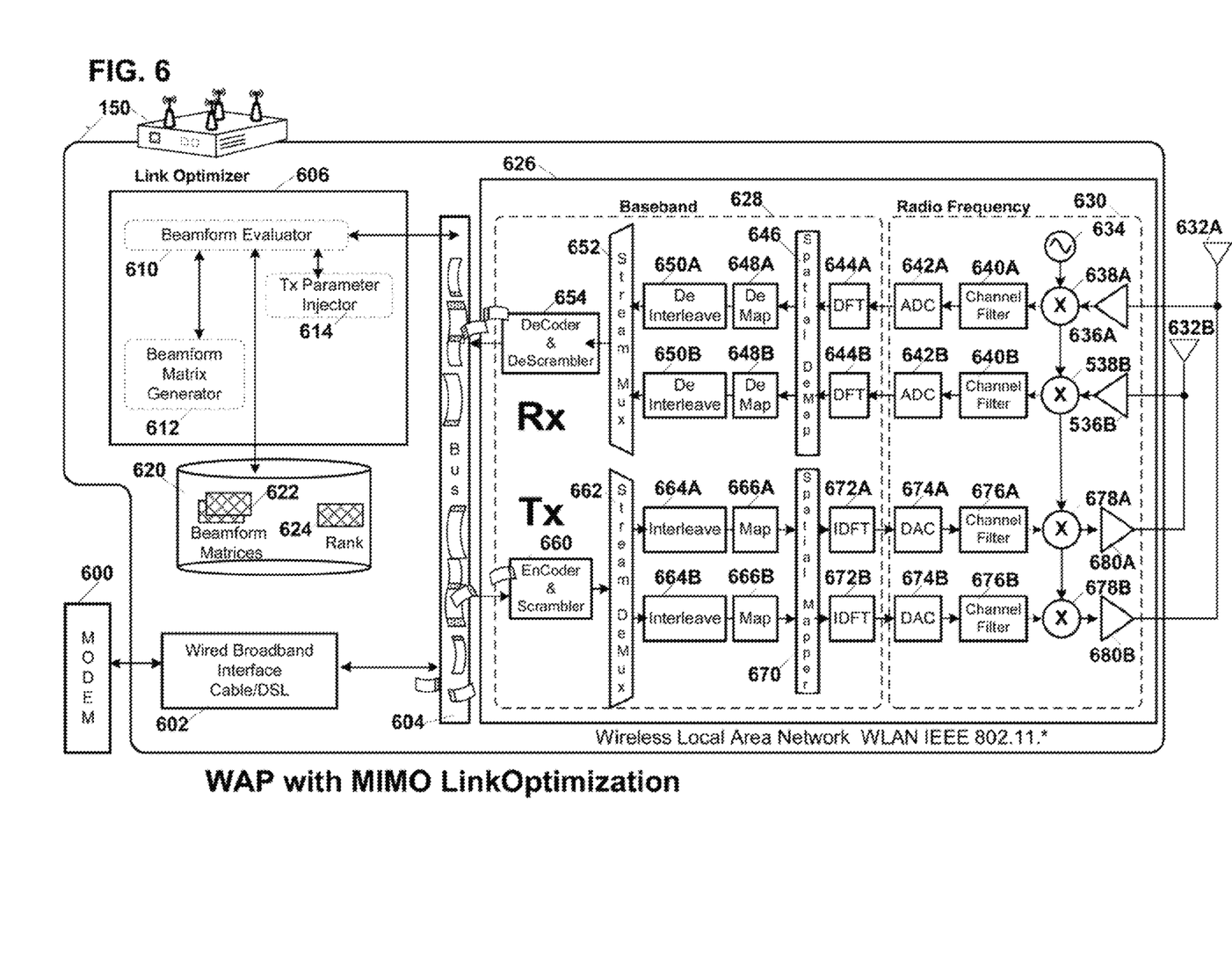
FIG. 6 is a hardware block diagram showing a WLAN node, in this case a wireless access point (WAP) in accordance with an embodiment of the invention.

FIG. 6 is a hardware block diagram showing a WLAN node, in this case a wireless access point (WAP) 150 as shown in FIG. 2, including support for blind beamforming. The wireless local area network (WLAN) stage 626 includes four discrete MIMO transceiver paths capable of transmission and reception of from one to four received streams. Only two transmit and two of the receive paths are shown for clarity.

The MIMO transceiver path components include antennas 632A and 632B. The antennas are coupled to radio frequency (RF) module 630 and baseband module 628 of the WLAN stage 626, which implements in an embodiment of the invention the IEEE 802.11* standard for WLAN, with the "*" standing for the particular sub-standard, e.g. a, b, g, n, ac.

A first MIMO receive path originates with the antenna 632A, and includes: low noise amplifier (LNA) 636A, the tunable oscillator 634 and mixer 638A which down converts the received data channel, for filtration by the channel filter 640A, conversion in the analog-to-digital converter (ADC) 642A and domain conversion from the frequency to the time domain in the Discrete Fourier Transform (DFT) module 644A. The corresponding second MIMO receive path components are labeled with the "B" suffix.

In the baseband module 628 the complex coefficients for each sub-channel in each symbol interval are subject to spatial demapping in spatial demapper 646 followed by demapping in the associated one of demappers 648A, 648B. The resultant bits are deinterleaved in the associated one of deinterleavers 650A, 650B. Next the received data is multiplexed in stream multiplexer 652 and decoded and descrambled in the decoder and descrambler 654 which couples to the packet based bus 604.

The transmit path components of two of the four transmit paths in this embodiment of the invention are also shown. The data to be transmitted is encoded and scrambled in the encoder and scrambler 660. it is then demultiplexed into independent data paths one for each antenna in the stream demultiplexer 662. Next data is interleaved and mapped in the associated one of interleavers 664A, 664B and Mappers 666A. 666B. Next the data complex coefficients corresponding to the data are spatially mapped in the spatial mapper 670 using a selected beamforming matrix. Then the mapped coefficients of each sub-channel are transformed from the frequency domain to the time domain in the associated one of inverse discrete Fourier transform (IDFT) modules 672A, 672B.

Next, in the radio frequency module 630 the digital-to-analog (DAC) conversion is accomplished by the associated one of DACs 674A, 674B, followed by filtration by the associated one of channel filters 676A, 676B. then the filtered signals are upconverted in the associated one of upconverters 678A, 678B and amplified by the associated one of power amplifiers 680A, 680B each coupled to an associated one of antennas 632A, 632B for transmission to the receiving device.

The transmit and receive paths operate under control of the link optimizer 606. The link optimizer includes: a beamform evaluator component 610, a beamform matrix generator component 612, and a transmit parameter injector component 614, all of which are coupled to storage 620.

The beamform matrix generator component is configured to generate discrete candidate beamforming matrices for spatially modulating successive communication packets from a MIMO capable transmitter, e.g. WAP 150 that supports beamforming to a recipient one of the nodes that does not support beamforming when blind beamforming is required. Each matrix is delivered to the spatial mapper 670 for spatial mapping the data for the associated communication packets.

The beamform evaluator configured to evaluate discrete ones among the set of candidate beam forming matrices generated by the beamform matrix generator based on receipt acknowledgements received on the receive path from the recipient one of the nodes for each successive communication packet transmitted from the MIMO capable transmitter one of the nodes. The successfully evaluated one of the candidate beam forming matrices is used in the spatial mapper 670 for transmission of subsequent communication packets from the MIMO transmitter to the recipient one of the nodes, thereby avoiding a requirement for either link calibration or a channel matrix or a beamforming matrix from the recipient node.

Storage 620 contains in an embodiment of the invention beamforming matrices 622, which may be in codebook format. Storage 620 also includes rankings 624 of the receipt acknowledgements associated with the beamform matrices evaluated by the beamform evaluator.

In an embodiment of the invention a transmit parameter injector component 614 is also included: to vary one or more of; cyclic prefix, transmit bit loading or transmit power levels of the transmit beamformed packets, which are in turn subject to receipt acknowledgement evaluation by the beamform evaluator.

In an embodiment of the invention where the WLAN device 150 comprises a wireless access point (WAP) the device also includes a broadband interface 602 for interfacing with a digital signal line (DSL) or cable modem 600.

Figure 7:
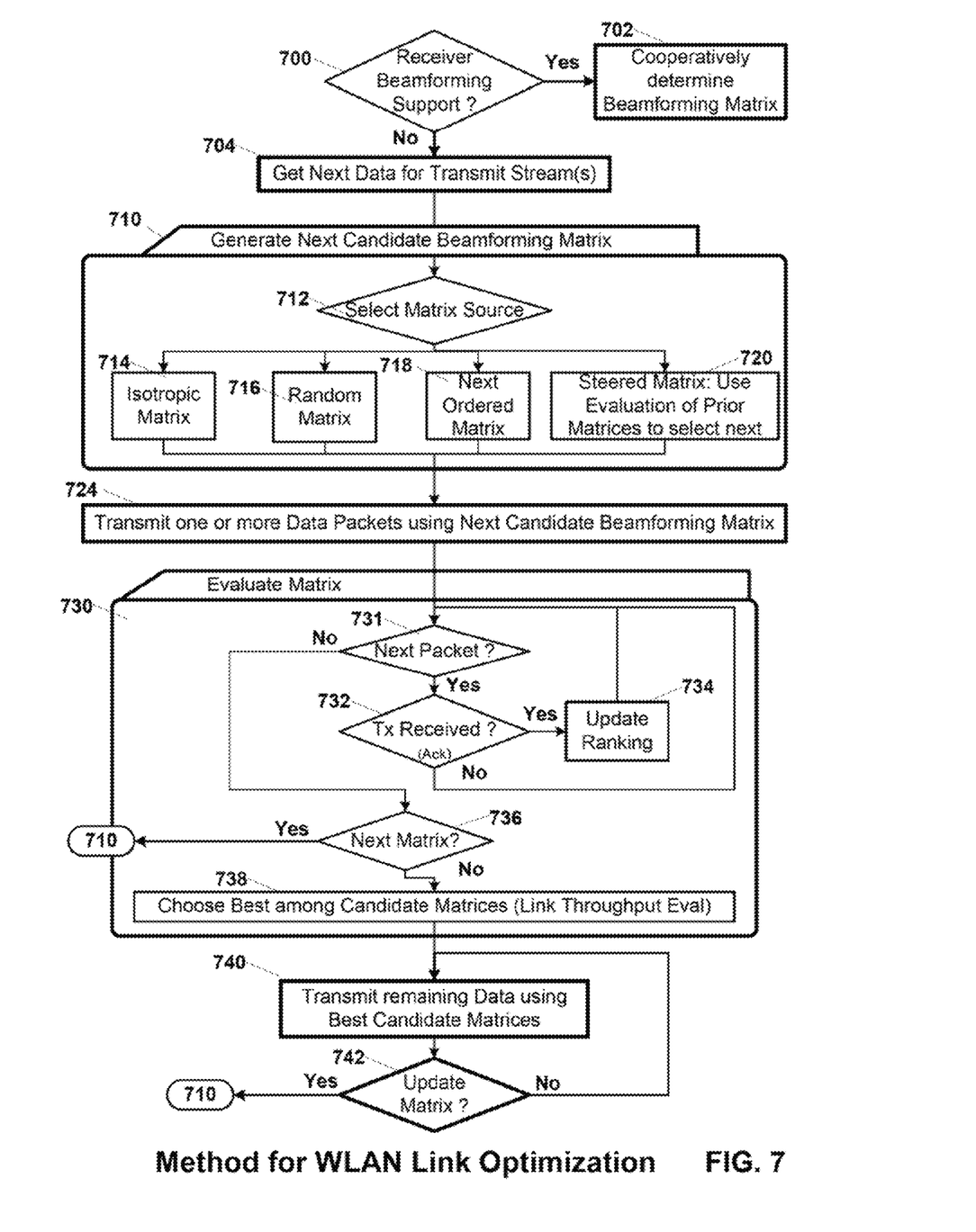
FIG. 7 is a process flow diagram of processes associated with WLAN link optimization.

FIG. 7 is a process flow diagram of processes associated with WLAN link optimization. In decision process 700 a determination is made based on a capabilities exchange as to whether the target receiving device supports beamforming. If it does control passed to process 702 for cooperative beamforming as discussed in connection with FIGS. 1-2. If beamforming is not supported control passed to process 704.

In process 704 the next blocks/packets of data for transmission are obtained and control is passed to processes 710 in which the next candidate beamforming/probing matrice(s) are generated. In decision process 712 a determination as to a matrix selection source is made. Choices include: the generation of a matrix exhibiting an isotropic radiation pattern in process 714; the generation of a random matrix in process 716; the generation of the next matrix in an ordered sequence in process 718; and the generation of a steered matrix in process 720. Steering involves the evaluation of prior beamforming/probing matrices and their relative effectiveness in terms of confirmed receipts by the receiving node, as a basis for determining or selecting subsequent beamforming/probing matrices.

Next, the selected candidate beamforming matrix is used in process 724 to transmit one or more data packets. Then in processes 730 each transmitted packet is evaluated based on receipt acknowledgments. Specifically in decision process 731 a determination as to whether receipt of each of the packets sent using the candidate beamforming matrix in the preceding process 724 have been evaluated. If all packets using the candidate matrix have been evaluated then control passes to decision process 736. Alternatively, if the current set of packets has not been evaluated then control passes to decision process 732. In decision process 732 a determination is made as to whether receipt of the data packet has been acknowledged with a responsive "ACK" packet from the receiving device/node. If not control returns to decision process 731. Alternately, if a receipt acknowledgement has been received for the given transmitted packet, in the current set, then control is passed to process 734 where the ranking of the associated beamforming matrix is updated after which control then returns to decision process 731. When the current packet or set of packets has been evaluated a decision is made in decision process 736 as to whether further beamforming/probing matrix evaluation is required. If it is then control returns to process 710. If not, e.g. if beamprobing is complete, then control passes to process 738. In process 738 the best among the candidate beamforming matrices is selected based on a comparison of relative percentages of "ACK" receipt acknowledgements for packets sent with each candidate beam forming matrix.

Next, in process 740 the best beamforming matrix is used for transmission of remaining data. Next a determination is made as to whether the beamforming matrix currently in use needs to be updated. This determination may be based on perceived changes in the channel or simply conducted periodically. If no update is required control returns to process 740 for the transmission of the next packets using the existing beamforming matrix. Alternately, if the matrix needs to be updated control returns to processes 710 for the generation of the next beamforming/probing matrix(s).

Beamform Matrix Generation Examples:

Random generation of beamforming matrices includes in one embodiment of the invention, the generation of matrices that have orthonormal columns (a unit norm vector in single stream case). In another embodiment of the invention, random generated matrices include only the constant modulus entries on the orthonormal columns Ordered probing can include the ordered traversal of solution space using one or more codebooks setting forth matrices appropriate to the number of streams which matrices are evenly dispersed across the solution space.

A backstop, fallback matrix option to either of the above techniques is a matrix which generates an isotropic radiation pattern from the antennas, the omnidirectional nature of which guarantees some minimal level of link throughput.

Link optimization to a legacy device with multiple antennas but without beamforming support can include in an embodiment of the invention, adaptive switching across streams.

In an embodiment of the invention one or more codebooks can be used which include predetermined transmit matrices, with the matrix dimensions in each codebook correspond to the number of communication streams, and with the number of codebooks equal to the number of streams that the device will support. Each entry in the codebook may have orthonormal columns. In an embodiment of the invention where it is desirable not to repeat beamprobing, when link adaptation changes the number of streams during successive transmission, eligible codebook matrix candidates are constrained as $\alpha \cdot C_l^{(p)} = C_k^{(p)}(:, 1:l)$ where the superscript p is the index of the codeword for various number of streams, and subscript l and k are the index into the codebooks for different number of streams (l and k streams respectively). $C_k^{(p)}(:, 1:l)$ means the first l columns of the matrix $C_k^{(p)}$ and a is a scalar to fulfill power constraint.

In other words to avoid repeat beamprobing we should have the lower dimensional codebook (a scaled version of it) be part of its higher dimensional counterpart. For example, each codeword in the codebook for 2 streams, should have its first column be a scaled version of the codeword in the codebook for single stream with the same index. Codebook matrix entries may be spatially dispersed using any of a number of constraints including but not limited to:

Chordal distances:

$$d_c = \frac{1}{\sqrt{2}} \|G_j G_j^H - G_k G_k^H\|_F,$$

or

Projection two norm distance: $d_p = \|G_j G_j^H - G_k G_k^H\|_2$ or

Fubini-study distance: $d_f = \cos^{-1} |\det(G_j^H G_k)|$ where $G_j$, $1 \leq j \leq M$, is the entries in each codebook, and M is the cardinality of the codebook. A typical design approach is to maximize the minimum distance across all pairs of codewords in each codebook.

In an embodiment of the invention, traversal of the codebooks is optimized as follows. Two codebooks are constructed one with a coarse distribution of matrices (P), with a cardinality $M_p$ and one with a fine distribution of matrices (Q) with a cardinality $M_q$. For each entry $P^{(l)}$, find K entries in Q with minimal distances (use any distance defined above) from it, call it adjoint candidate set $P_a^{(l)}$.)

The expression for qualified entries in the codebook thus constructed is: $C = \cup_{l=1}^{M_p}(P^{(l)} \cup P_a^{(l)})$. With this codebook design, we can probe to find the best performing index k in P and given the index k further probe $P_a^{(k)}$ for the best solution. The cardinality of this hybrid codebook is: $M_p(1+K)$. The aforementioned technique in generating the steering matrices comprises an embodiment of the steering beamforming embodiment of the invention described in FIG. 3C. In this embodiment of the invention, the probing result in the coarse codebook P and the best index thus obtained (for instance k), can steer the further generation (selection) of the successive beamforming matrices, i.e. the adjoint candidate set $P_a^{(k)}$.

Where the number of transmit communication streams equals to the number of antennas, no resort to codebooks is required, rather beamprobing would resort to randomly generated unitary matrices since all the distances defined above would be zeros.

In alternate embodiments of the invention the link optimizer may be part of either or both a WAP or a station without departing from the scope of the Claimed invention.

The components and processes disclosed herein may be implemented a software, hardware, firmware, or a combination thereof, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A link optimizer apparatus for optimizing a link on a wireless local area network (WLAN), supporting wireless communications between a wireless access point (WAP) node and associated station nodes on a selected one of a plurality of communication channels; and the link optimizer apparatus comprising:

a beamform matrix generator configured to generate discrete candidate beamforming matrices for spatially modulating successive communication packets from a multiple-input multiple-output (MIMO) capable transmitter one of the WAP and station nodes that supports beamforming to a recipient one of the WAP and station nodes that does not support beamforming;

a beamform evaluator configured to evaluate discrete ones among the set of candidate beam forming matrices generated by the beamform matrix generator based on a comparison of relative percentages of "ACK" receipt acknowledgements from the recipient one of the WAP and station nodes for each successive communication packet transmitted with each candidate beam forming matrix from the MIMO capable transmitter one of the WAP and station nodes; and to utilize a successfully evaluated one of the candidate beam forming matrices for transmission of subsequent communication packets from the MIMO transmitter one of the nodes to the recipient one of the nodes, thereby avoiding a requirement for either link calibration or a channel matrix or a beamforming matrix from the recipient node.

2. The link optimizer apparatus of claim 1, further comprising:

the beamform matrix generator further configured to steer the generation of successive ones of the discrete beamforming matrices based on successive evaluations of the relative amounts of "ACK" receipt acknowledgments attributed to transmissions utilizing prior generated ones of the candidate beamforming matrices.

3. The link optimizer apparatus of claim 1 integral with at least one of: the WAP node and one of the associated station nodes.

4. A method for improving link performance on a wireless local area network (WLAN) including a wireless access point node (WAP) and a plurality of station nodes supporting packet communications with one another on a selected one of a plurality of communication channels; and the method comprising:

transmitting successive communication packets from a multiple-input multiple-output (MIMO) capable transmitter one of the WAP and station nodes that supports beamforming to a recipient one of the WAP and station nodes that does not support beamforming and each communication packet spatially modulated with discrete candidate beamforming matrices;

evaluating the discrete ones among the set of candidate beam forming matrices based on a comparison of relative percentages of "ACK" receipt acknowledgements from recipient ones of the WAP and station nodes for each successive communication packet transmitted in the transmitting act with each candidate beam forming matrix; and utilizing a successfully evaluated one of the candidate beam forming matrices from the evaluating act for transmission of subsequent communication packets from the MIMO transmitter one of the WAP and station nodes to the recipient one of the WAP and station nodes, thereby avoiding a requirement for either link calibration or a channel matrix or a beamforming matrix from the recipient node.

5. The method for improving link performance of claim 4, wherein the generating act further comprises at least one of the acts of:

randomly generating each discrete candidate beamforming matrix;

ordering the generation of each discrete candidate beamforming matrix; and steering the generation of successive ones of the discrete beamforming matrices based on successive evaluations of the relative amounts of "ACK" receipt acknowledgments attributed to transmissions utilizing prior generated ones of the candidate beamforming matrices.

* * * * *